United States Patent
Fricke et al.

(10) Patent No.: US 11,119,113 B2
(45) Date of Patent: Sep. 14, 2021

(54) ROTATIONAL SPEED SENSOR ARRANGEMENT

(71) Applicant: Volkswagen Aktiengesellschaft, Wolfsburg (DE)

(72) Inventors: Jens Fricke, Braunschweig (DE); Julian Herrmann, Gifhorn (DE); Michael Boeseke, Sassenburg (DE); Ines Matteg, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/792,145

(22) Filed: Feb. 14, 2020

(65) Prior Publication Data
US 2020/0182899 A1 Jun. 11, 2020

Related U.S. Application Data

(63) Continuation of application No. PCT/EP2018/069606, filed on Jul. 19, 2018.

(30) Foreign Application Priority Data

Aug. 14, 2017 (DE) .................... 10 2017 214 166.2

(51) Int. Cl.
*G01P 3/488* (2006.01)
*G01D 5/14* (2006.01)
*G01P 13/04* (2006.01)

(52) U.S. Cl.
CPC ............ *G01P 3/488* (2013.01); *G01D 5/147* (2013.01); *G01P 13/045* (2013.01)

(58) Field of Classification Search
CPC ........ G01P 3/488; G01P 13/045; G01D 5/147
(Continued)

(56) References Cited

U.S. PATENT DOCUMENTS 5,165,271 A 11/1992 Stepper et al.
5,489,844 A 2/1996 Preston et al.
(Continued)

FOREIGN PATENT DOCUMENTS

CN 201589782 U 9/2010
CN 102506905 A 6/2012
(Continued)

OTHER PUBLICATIONS

Chen Yang Technologies GmbH & Co. KG, "Hall Effect Differential Gear Tooth Sensors CYGTS101DC-S," Ver. 2, pp. 1-6 (2016).
(Continued)

*Primary Examiner* — Christopher P McAndrew
*Assistant Examiner* — Zannatul Ferdous
(74) *Attorney, Agent, or Firm* — Muncy, Geissler, Olds & Lowe, P.C.

(57) ABSTRACT

A rotational speed sensor arrangement is provided that includes a transmitter wheel, which has signal markers that are spaced apart from one another; a sensor with at least two Hall sensor elements that form a differential Hall sensor and that each output a Hall signal as a function of the position and/or motion of the signal markers; and a signal circuit that determines an output signal based on the Hall signal, and defines a rotational position of the transmitter wheel based on the output signal, wherein the signal markers have radially extending tooth elements with two switching flanks, and the switching flanks converge in a switching edge. A drive shaft arrangement, an internal combustion engine, and a motor vehicle are also provided.

17 Claims, 3 Drawing Sheets

(58) Field of Classification Search
USPC .................. 73/114.26; 324/247, 207.18
See application file for complete search history.

(56) References Cited

U.S. PATENT DOCUMENTS

| | | | |
|---|---|---|---|
| 5,714,016 A | 2/1998 | Ueda et al. | |
| 5,729,127 A | 3/1998 | Tamura et al. | |
| 5,789,658 A | 8/1998 | Henn et al. | |
| 5,814,985 A | 9/1998 | Oudet | |
| 5,869,962 A | 2/1999 | Kasumi et al. | |
| 7,772,839 B2* | 8/2010 | Watson | B60R 21/0136 324/228 |
| 8,250,910 B2* | 8/2012 | Rolew | G01P 13/045 73/114.26 |
| 2009/0001965 A1* | 1/2009 | Ausserlechner | G01P 21/02 324/202 |
| 2010/0107747 A1 | 5/2010 | Rolew et al. | |
| 2012/0249133 A1* | 10/2012 | Friedrich | G01R 33/072 324/247 |
| 2016/0041006 A1* | 2/2016 | Ausserlechner | G01R 33/077 324/207.2 |

FOREIGN PATENT DOCUMENTS

| | | |
|---|---|---|
| CN | 104698212 A | 6/2015 |
| CN | 106342456 A | 1/2017 |
| DE | 35 23 250 A1 | 1/1986 |
| DE | 39 04 958 A1 | 8/1990 |
| DE | 40 18 834 A1 | 1/1991 |
| DE | 195 33 964 A1 | 3/1996 |
| DE | 196 14 165 A1 | 10/1996 |
| DE | 195 40 674 C2 | 1/1999 |
| DE | 692 29 131 T2 | 4/1999 |
| DE | 693 24 232 T2 | 8/1999 |
| DE | 695 11 063 T2 | 4/2000 |
| DE | 103 07 349 A1 | 9/2004 |
| DE | 10 2006 061 572 A1 | 7/2008 |
| DE | 10 2006 061 575 A1 | 7/2008 |
| DE | 10 2007 029 819 A1 | 1/2009 |
| DE | 10 2008 034 630 B4 | 2/2012 |
| GB | 2 058 358 A | 4/1981 |

OTHER PUBLICATIONS

Chinese Office Action dated Jun. 9, 2021 in corresponding application 201880046922.2.

* cited by examiner

ROTATIONAL SPEED SENSOR ARRANGEMENT

This nonprovisional application is a continuation of International Application No. PCT/EP2018/069606, which was filed on Jul. 19, 2018, and which claims priority to German Patent Application No. 10 2017 214 166.2, which was filed in Germany on Aug. 14, 2017, and which are both herein incorporated by reference

BACKGROUND OF THE INVENTION

Field of the Invention

The present invention relates to a rotational speed sensor arrangement in which a transmitter wheel acts on a differential Hall sensor, and a signal circuit determines, based on a Hall signal, an output signal that indicates a rotational position and/or a rotational motion of the transmitter wheel.

Description of the Background Art

A variety of rotational speed sensors exist that are used to sense motor speeds; they are also called speed transmitters, and are necessary for modern engine management. They serve to determine the motor speed, to sense the angular position of the crankshaft (position of the pistons), and also to sense a working cycle position in four-stroke engines (0-720° crankshaft angle) by detecting the position of the camshaft in relation to the crankshaft.

The basic principle is to produce magnetic field changes through so-called pulse generator wheels (transmitter wheels). Since the frequency of the sensed pulses also increases with increasing speed, the speed can be calculated in the control unit using the time interval between two or more pulses. A distinction is made between passive and active rotational speed sensors.

Passive rotational speed sensors are inductive speed sensors, for example, in which the rotation of a pulse generator wheel induces in a coil a periodic output voltage that is proportional to the rate of change, and thus to the motor speed. The amplitude of this voltage rises sharply with increasing rotational speed. For analysis in the control unit, the latter converts the sinusoidal signal voltage with sharply varying amplitudes into a square wave voltage with constant amplitude. This square wave voltage waveform (output signal) is used to determine the speed and a rotational position (e.g., shaft angle of a camshaft, of a crankshaft, or of intermediate shafts). Such passive sensors are relatively sensitive to tolerances (orientation and arrangement of the sensor with respect to the pulse generator wheel or sensor wheel), and a certain minimum speed is necessary for these sensors to respond at all. Such sensors are unsuitable for determining the position of a stationary transmitter wheel.

This is the reason for the increasing use of active rotational speed sensors that operate according to the magnetostatic principle and permit a rotational speed measurement even at very low rotational speeds. Simple Hall sensors, for example, are used in such sensors, but are only suitable to a limited extent on account of signal fluctuations (caused by temperature or the size of the air gap between the sensor and transmitter wheel, for example). This also applies in the case of magnetically active rotors (multipole wheels) in which the different magnetic poles are distributed over the circumference of the transmitter wheel and induce a Hall voltage. The structure of the Hall sensors—which can be constructed without a magnet—is simplified. However, substantially more expensive transmitter wheels having a magnetizable coating are required.

In order to improve the signal quality, so-called gradient sensors were developed, which can be implemented on the basis of differential Hall sensors or differential field plate sensors and are better suited for scanning magnetically passive rotors (transmitter wheels) than simple Hall sensors. Such differential Hall sensors provide clear signals with normal air gaps, but also at relatively high temperatures such as can occur in the internal combustion engine area, in particular. The raw signal that is picked up is processed by an analysis circuit in the sensor, and the amplitude of the output signal is independent of the rotational speed.

Multipole or ferromagnetic steel transmitter wheels with relatively low resolution are customarily used (generally a tooth profile with one, two, three, or four teeth). Although a rotational speed sensor arrangement can indeed be achieved by this means in the relatively limited installation space that is available on the camshaft (small diameter of the transmitter wheel), only a relatively low resolution is then available on the transmitter wheel. As a result, however, the resolution of the rotational position and of the speed curve is nevertheless also relatively low. The resolution of the transmitter wheels cannot be increased for small diameters due to the tooth profile customarily used, with essentially rectangular or trapezoidal profiles. An increased tooth count, which would increase the resolution, requires larger transmitter wheels, but these often are undesirable or even impossible to implement for space reasons.

Especially with modern combustion processes, rapid camshaft adjusters are required at the intake side of the motor, and these need a position feedback signal at the engine control unit multiple times per camshaft revolution for correct regulation of their adjustment position. The very limited installation space available in the camshaft region interferes with the use of the requisite high-resolution transmitter wheels, which require a diameter of over 80 mm.

Prior art sensor arrangements are known from DE 10 2007 029 819 A1 and from DE 10 2006 061 575 A1, in which specific Hall sensor arrangements are specified for incremental determination of an angle of rotation and a direction of rotation. However, the installation space problem is not solved by means of these arrangements.

SUMMARY OF THE INVENTION

It is therefore an object of the present invention to provide a rotational speed sensor arrangement, in particular a Hall sensor arrangement, in which a high resolution with small transmitter wheel diameter in the motor vehicle internal combustion engine area can be achieved.

The rotational speed sensor arrangement according to an exemplary embodiment of the invention includes a transmitter wheel, which has signal markers that are spaced apart from one another; a sensor with at least two Hall sensor elements that form a differential Hall sensor and that each output a Hall signal as a function of the position and/or of the motion of the signal markers of the transmitter wheel; and a signal circuit that determines an output signal based on the Hall signal, and defines a rotational position and/or rotational speed of the transmitter wheel based on the output signal.

The invention is distinguished in that the signal markers have radially extending tooth elements with two tooth flanks or switching flanks, and these switching flanks converge in a (common) switching edge. In known transmitter wheels, the radial tooth elements are generally designed as more or less rectangular or trapezoidal switching elements, which consequently have a relatively large extent in the circumferential direction. Between the switching flanks in these transmitter wheels, a tip section is formed that extends in the circumferential direction and connects the two switching flanks to each other. Consequently, the number of signal markers that can be distributed over the circumference of a transmitter wheel is limited, and likewise the signal resolution.

The switching flanks can be designed such that they meet in a common switching edge. Consequently, the tooth body as a whole can be made significantly narrower (smaller extent in the circumferential direction) so the number of tooth elements serving as signal markers over the circumference of the transmitter wheel can be increased. It is also possible in this design for the gaps between the tooth elements that are necessary for a discrete switching signal to be made narrower. In this way, it is possible to achieve a transmitter wheel with high resolution and small diameter.

In this design, there are embodiments in which the signal markers also include gaps that constitute equal distances between the tooth elements in the circumferential direction. Due to the fixed dimensioning of the gaps between the tooth elements, a precise rotational speed of the transmitter wheel can be sensed with the aid of the differential Hall sensor.

A reference marker can be provided that is designed as an additional control tooth element in a gap. In the present invention, such an additional control tooth element can be designed such that it fits into even a relatively narrow gap, so that a control tooth element is formed between two tooth elements, and an altered output signal frequency (shortened timing) is produced in this region. This altered signal rhythm signals a reference position (zero crossing) of the transmitter wheel, on the basis of which the absolute position of the transmitter wheel can also be determined in addition to the rotational speed. This is helpful, especially for rotational speed sensor arrangements for camshafts, because the rotational position of the crankshaft can also be determined through the absolute position of the camshaft; this rotational position indicates which timing cycle the crankshaft is in. In combination with a rotational speed sensor arrangement for the crankshaft, the precise crankshaft position in a 720° cycle can be determined in this way.

The reference marker can be designed as a reference gap with an increased distance between two adjacent tooth elements. Such a reference gap causes a reduction in the signal frequency or a reduction in the spacing between two signals (slowed signal rhythm), which likewise can be used as a reference signal to indicate the absolute position of the camshaft, and thus also of a crankshaft.

The switching flanks can form an angle between 20° and 40°, and in particular an angle of 30°, to one another. Such a design of the switching flanks permits the detection of a clear signal peak upon transition of the differential Hall sensor (or the Hall sensor elements) from the tooth gap to one switching flank of the tooth element, and further from the other switching flank of the tooth element to the tooth gap. A clearly defined zero-crossing of the Hall signal between these two Hall signal peaks then exists in the region of the switching edge (the switching flanks converge there), which in turn can be used for defining the output signal.

The switching edges can define an outer tip circle and the gaps define an inner root circle, wherein the ratio between root circle diameter and tip circle diameter is between 1 to 1.2 and 1 to 1.4, and in particular is between 1 to 1.3 and 1 to 1.35. This results in radial tooth height ratios that ensure a reliable and tolerance-stable Hall signal. Tolerance-stable in this context means that the distance from the Hall sensor elements to the transmitter wheel can be set at distances with relatively wide tolerances.

The diameter of the tip circle can be between 40 mm and 50 mm and, in particular, is 45 mm. A transmitter wheel with such a tip circle diameter has a size that permits use in a rotational speed sensor arrangement on a camshaft, in particular.

The tip circle diameter can be less than 40 mm.

The tooth elements can be arranged at an angular spacing of 24°-36°, in particular at an angular spacing of 30°. In this way, ten to fifteen tooth elements, and in particular twelve tooth elements, can be implemented on the transmitter wheel. With an additional reference or control tooth element, the total count increases to eleven to sixteen tooth elements, and in particular thirteen tooth elements.

If the angular spacing is reduced to 15°, up to 24 tooth elements can be arranged in the case of a diameter of approximately 45 mm.

A radial height of the tooth elements between 8 mm and 15 mm likewise makes it possible to improve the signal quality in a tolerance-stable manner.

In examples in which a transition radius that is between 2 mm and 3 mm, and in particular is 2.5 mm, is formed between the switching flanks and the gap floor, the transmitter wheels can be made of a ferromagnetic material in a simple sintering process, in which the final shape can be produced with little machining in a primary forming process.

The sensor device can includes at least three Hall sensor elements, which in pairs form a first and a second differential Hall sensor, it is possible to obtain Hall signals that are phase-shifted differently depending on the direction of rotation of the transmitter wheel and that provide information on the direction of rotation. The information on the direction of rotation is generated by the means that one pair of the three Hall sensor elements in each case forms two differential Hall sensors that are offset from one another in the direction of rotation and whose signal is slightly phase-shifted, wherein the arithmetic sign of the phase shift changes upon a change in the direction of rotation. The direction of rotation of the transmitter wheel can be determined in this way. Such information on the direction of rotation is helpful, especially in an application in connection with crankshafts, in which a change in the direction of rotation can occur upon stopping (in particular during passage through a bottom dead center or top dead center), and detection of this change in the direction of rotation is necessary for determining the absolute position of the crankshaft (KW), for example in order to be able to cleanly perform a start/stop cycle of the motor. During a stop in a start/stop cycle, it is necessary to sense the position of the KW for a rapid restart of an internal combustion engine (ICE). Because an ICE can also turn backwards relative to the motor rotation direction (but can also oscillate forward and back) when stopping, detection of the direction of rotation is necessary. The result is that the engine control unit knows the position of the KW at all times, and even when the motor is stationary. The KW and camshaft are, and remain, "synchronized." This information is used for ignition/injection in the next possible cylinder for a rapid, delay-free, and convenient restart.

A drive shaft arrangement with a rotational speed sensor arrangement according to the invention in which the drive shaft arrangement is implemented as a camshaft and/or as a crankshaft permits the use of especially rapid camshaft adjusters that are necessary for control of modern motors.

Due to the high resolution in detecting the camshaft position and speed, an especially precise and rapid control of the camshaft adjuster is possible.

An internal combustion engine with a drive shaft arrangement according to and a motor vehicle with such an internal combustion engine are provided and are useful, especially for modern, high-efficiency drive concepts.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
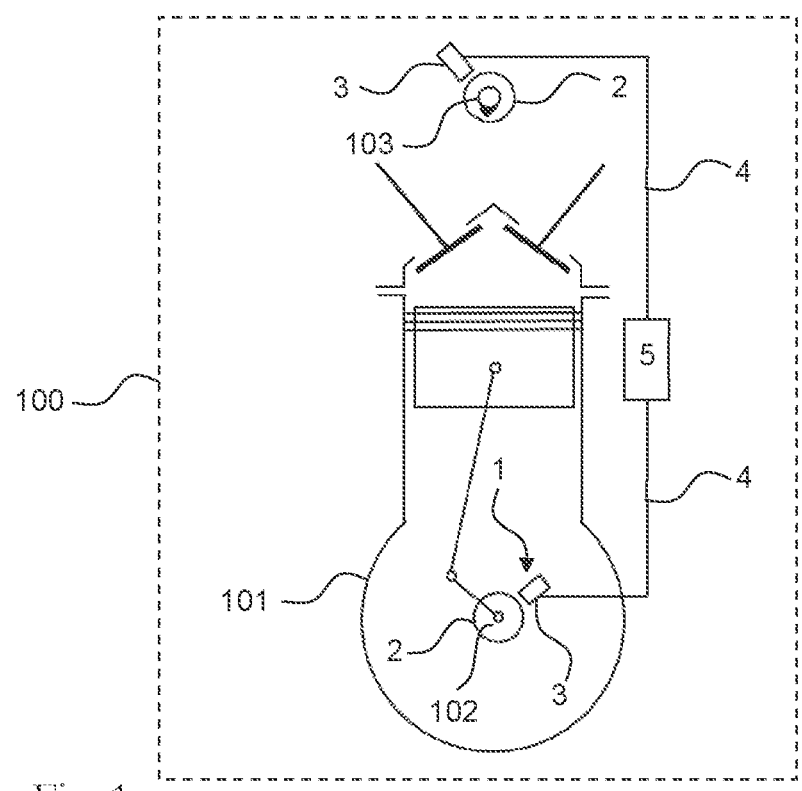
FIG. 1 is a schematic representation of a motor vehicle with an internal combustion engine and a drive shaft arrangement, in which a rotational speed sensor arrangement according to the invention is provided both on the crankshaft and on the camshaft.

FIG. 1 schematically shows an exemplary embodiment of a motor vehicle 100 according to the invention with an internal combustion engine 101 that includes a drive shaft arrangement with a crankshaft 102 and a camshaft 103. The crankshaft 102 and the camshaft 103 each have arranged thereupon a rotational speed sensor arrangement 1 that includes a transmitter wheel 2 and a sensor 3 implemented as a differential Hall sensor. Each of the rotational speed sensor arrangements 1 is suitable for sensing both the position and the rotational speed of the crankshaft 102 or the camshaft 103, and for delivering a corresponding output signal through a data line 4 to an engine control unit 5, which controls various motor functions on the basis of the signals, in particular the adjustment of a camshaft adjuster.

Figure 2:
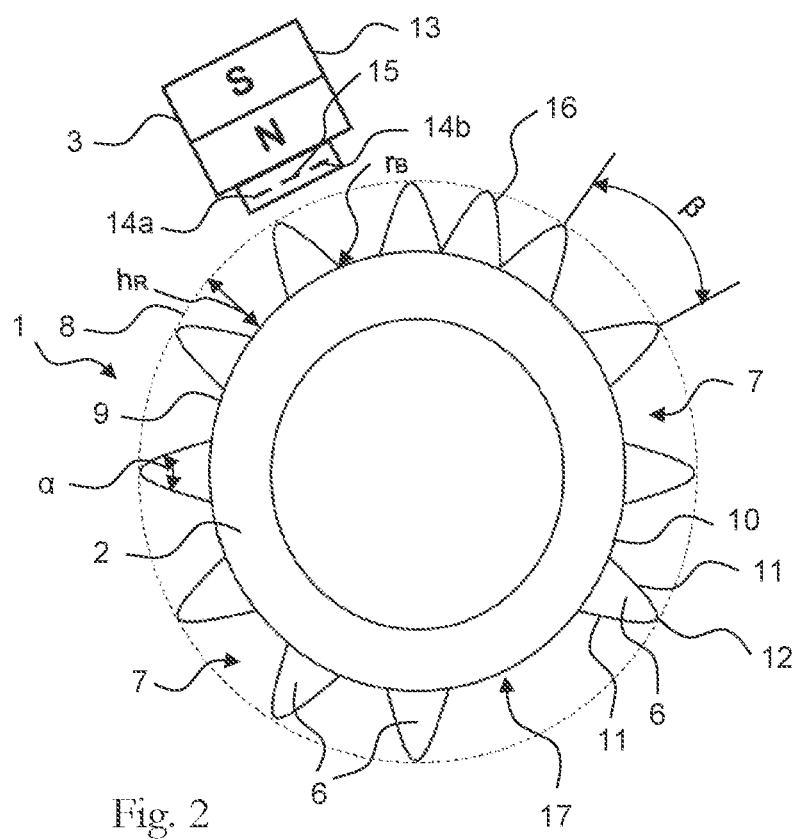
FIG. 2 a schematic representation of a rotational speed sensor arrangement according to the invention.

The structure and function of the rotational speed sensor arrangement 1 is described on the basis of FIG. 2. The rotational speed sensor arrangement 1 includes the transmitter wheel 2 and the sensor 3. The transmitter wheel 2 is implemented as an annular ring gear, which can be made of a ferromagnetic sintered material, for example a 4-Sint-D10 per DIN 30910. Deep-drawn sheet metal, stamped sheet metal, milled workpieces, etc., can also be used. In the case of an arrangement of a sensor 3 with integrated magnet 13, the transmitter wheel material must always be ferromagnetic (magnetically conductive, magnetically soft), however. The tooth elements 6 formed on the transmitter wheel, between which are formed gaps 7, constitute the signal markers by means of which the sensor 3 produces appropriate signals. The tooth elements 6 extend radially from the transmitter wheel 2 and define a tip circle 8 whose diameter is 1.2 to 1.4 times the diameter of a root circle 9, which is defined by the deepest point of the bottom regions of the gaps 7.

The tooth elements 6 are defined by tooth flanks that constitute switching flanks 11 and that converge in a switching edge 12 in each case. The switching flanks 11 enclose an angle α of between 20° and 40°, and in particular an angle of 30°, to one another, and transition into the bottom region 10 with a transition radius $r_B$. The tooth elements 6 are arranged at an angular spacing of 24°-36°, in particular at an angular spacing of 30° (angle β).

In a typical exemplary embodiment, the diameter of the tip circle 8 is between 40 mm and 50 mm, and the radial height $h_R$ of the tooth elements 6 is between 8 mm and 15 mm, and the transition radius $r_B$ is between 2 mm and 3 mm, in particular is 2.5 mm. With such a geometry, between 10 and 15 tooth elements 6 are distributed over the circumference of the transmitter wheel 2, and generate a high resolution pulse signal in conjunction with the sensor 3, which signal indicates the absolute rotational position, and if applicable also the direction of rotation, of the transmitter wheel.

The sensor 3 shown includes a permanent magnet 13 with a north pole and a south pole, on the end face of which are arranged at least two Hall sensor elements 14a, 14b, to which a supply voltage is applied and through which the magnetic field of the permanent magnet 13 passes in the direction of the transmitter wheel. Depending on whether the Hall sensor element 14a, 14b is located opposite a gap 7 or a switching edge 12 or a switching flank 11 of the tooth element 6, a Hall voltage is induced that corresponds to the position of the tooth element 6 or of the gap relative to the Hall sensor 14a, 14b. Taking a difference of the signals from the two sensors 14a, 14b permits a reduction in magnetic interference signals and an improved signal-to-noise ratio.

In place of the ferromagnetic transmitter wheel 2 with tooth elements 6 and gaps 7, it is also possible to use so-called multipole wheels, in which a magnetizable plastic is applied to a carrier and is magnetized in alternation. These magnetic north poles and south poles arranged in alternation then perform the function of the teeth or gaps of the pulse generator wheel. No permanent magnet 13 is required in the sensor 3 when such a multipole transmitter wheel is used.

In an alternative embodiment, a third Hall sensor 15 is optionally arranged so that the sensor 3 carries two differential Hall sensor arrangements, which in each case are composed of the Hall sensor elements 14a and 15 as well as of the Hall sensor elements 15 and 14b. Such an arrangement yields two differential sensor signals that are delivered phase-shifted in each case, and thus can detect the direction of rotation of the transmitter wheel. The arithmetic sign of the phase shift changes as a function of direction of rotation. This phase shift can be processed internally to the sensor, so that the sensor 3 delivers the information on the direction of rotation as a digitally coded signal (pulse-width modulated as a general rule).

For detection of the absolute rotational position, a control tooth element 16 is provided that is located in the gap between two tooth elements 6. Alternatively, an enlarged gap or an omitted control tooth element 6 can be provided between two adjacent control tooth elements 6 as a reference marker; such a gap is indicated with reference symbol 17 in FIG. 2.

Figure 3:
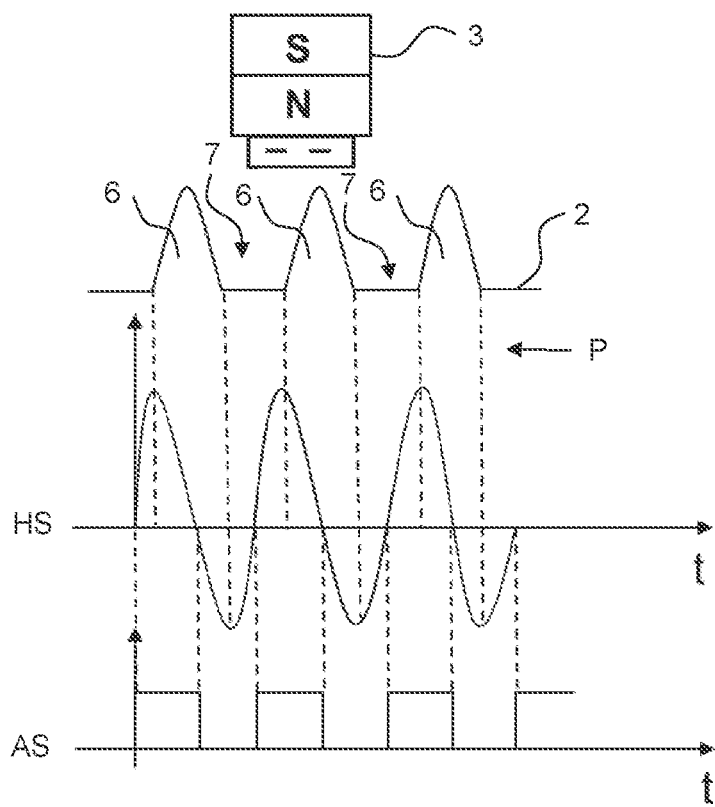
FIG. 3 is a schematic representation of a relationship between sensor, transmitter wheel geometry, Hall signal, and output signal.

FIG. 3 shows the relationship between the position of the transmitter wheel profile relative to the sensor 3, the delivered Hall signal HS, and the output signal AS ultimately determined for control. If the transmitter wheel profile (shown unrolled) moves in the direction of the arrow P relative to the sensor 3, a Hall voltage waveform HS is produced by the Hall sensor elements 14. The zero crossing of the voltage flank, which takes place once in the region of the switching edge 12 and in the center of the gap between two adjacent tooth elements 6, serves in each case to determine the output signal AS. The digital square wave signal AS thus produced is used to sense the rotational speed or the rotational position (position) of the transmitter wheel, and thus to sense the rotational speed or the rotational position (position) of an associated component, for example a camshaft or a crankshaft.

Figure 3A:
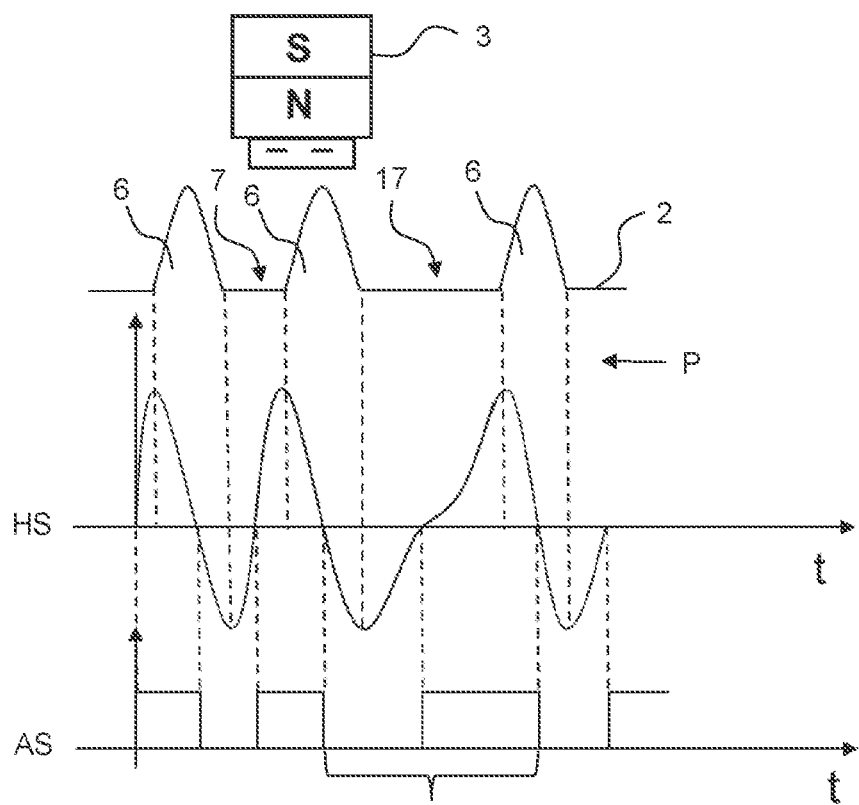
FIG. 3A illustrates the relationship shown in FIG. 3, in which a reference marker is implemented as an enlarged tooth gap.
Figure 3B:
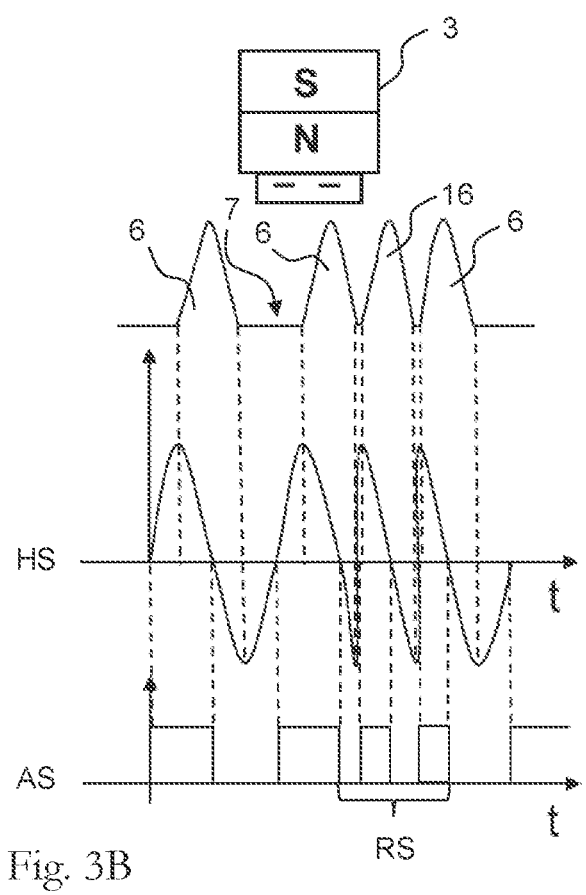
FIG. 3B illustrates the relationship shown in FIGS. 3 and 3A, in which a reference marker is implemented as an additional control tooth element.

FIGS. 3A and 3B show a signal sequence in which either a reference gap 17 or an additional control tooth element 16 creates an altered reference signal (RS), which can indicate the absolute position of the transmitter wheel with respect to the sensor.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rotational speed sensor arrangement comprising:
a transmitter wheel that has signal markers that are spaced apart from one another;
a sensor with at least two Hall sensor elements that form a differential Hall sensor and that output a Hall signal as a function of a position and/or motion of the signal markers; and
a signal circuit that determines an output signal based on the Hall signal and defines a rotational position of the transmitter wheel based on the output signal,
wherein the signal markers have radially extending tooth elements with two switching flanks, and
wherein the two switching flanks converge to a single switching edge as a common edge of the two switching flanks.

2. The rotational speed sensor arrangement according to claim 1, wherein the signal markers include gaps that form equal distances between the tooth elements in the circumferential direction.

3. A rotational speed sensor arrangement comprising:
a transmitter wheel that has signal markers that are spaced apart from one another;
a sensor with at least two Hall sensor elements that form a differential Hall sensor and that output a Hall signal as a function of the position and/or motion of the signal markers; and
a signal circuit that determines an output signal based on the Hall signal and defines a rotational position of the transmitter wheel based on the output signal,
wherein the signal markers have radially extending tooth elements with two switching flanks,
wherein the two switching flanks converge to a single switching edge, and
wherein a reference marker is provided that is designed as an additional control tooth element in a particular gap of gaps disposed between each of the signal markers.

4. The rotational speed sensor arrangement according to claim 1, wherein a reference marker is provided that is designed as a reference gap with an increased distance between two adjacent tooth elements.

5. The rotational speed sensor arrangement according to claim 1, wherein the switching flanks form an angle between 20° and 40°, or an angle of 30° to one another.

6. The rotational speed sensor arrangement according to claim 2, wherein the switching edges define an outer tip circle and the gaps define an inner root circle, and wherein the ratio between root circle diameter and tip circle diameter is between 1 to 1.2 and 1 to 1.4, and in particular is between 1 to 1.3 and 1 to 1.35.

7. The rotational speed sensor arrangement according to claim 6, wherein the diameter of the tip circle is between 40 mm and 50 mm or is 45 mm.

8. The rotational speed sensor arrangement according to claim 1, wherein the tooth elements are arranged at an angular spacing of 24° to 36°, or an angular spacing of 30°.

9. The rotational speed sensor arrangement according to claim 1, wherein the radial height of the tooth elements is between 8 mm and 15 mm.

10. The rotational speed sensor arrangement according to claim 1, wherein a transition radius that is between 2 mm and 3 mm or is 2.5 mm, is formed between the switching flanks and a gap floor.

11. The rotational speed sensor arrangement according to claim 1, wherein the sensor device includes at least three Hall sensor elements, which form a first and a second differential Hall sensor that supply Hall signals that are phase-shifted differently depending on the direction of rotation of the transmitter wheel and that constitute information on the direction of rotation.

12. A drive shaft arrangement comprising a rotational speed sensor arrangement according to claim 1, wherein the drive shaft arrangement is a camshaft or a crankshaft.

13. An internal combustion engine comprising a drive shaft arrangement according to claim 12.

14. A motor vehicle comprising an internal combustion engine according to claim 13.

15. The rotational speed sensor arrangement according to claim 1, wherein the single switching edge formed between the two switching flanks of each of the signal markers runs parallel to an axis of rotation of the transmitter wheel.

16. The rotational speed sensor arrangement according to claim 1, wherein the switching flanks converge in the single switching edge at a peak of the tooth element.

17. The rotational speed sensor arrangement according to claim 3, wherein the tooth elements are arranged at a regular angular spacing of 24° to 36° about an outer circumference of the transmitter wheel forming the gaps between the tooth elements.

* * * * *